(12) United States Patent
Tibrewal

(10) Patent No.: US 11,079,950 B2
(45) Date of Patent: Aug. 3, 2021

(54) ENABLING APPLICATION CONTROL PATH OVER A REMOTE DATA FACILITY LINK

(71) Applicant: EMC IP Holding Company LLC, Hopkinton, MA (US)

(72) Inventor: Piyush Tibrewal, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/384,864

(22) Filed: Apr. 15, 2019

(65) Prior Publication Data
US 2020/0326867 A1    Oct. 15, 2020

(51) Int. Cl.
G06F 3/06    (2006.01)

(52) U.S. Cl.
CPC .......... G06F 3/0635 (2013.01); G06F 3/0623 (2013.01); G06F 3/0643 (2013.01); G06F 3/0659 (2013.01); G06F 3/0674 (2013.01)

(58) Field of Classification Search
CPC .... G06F 3/0635; G06F 3/0643; G06F 3/0623; G06F 3/0674; G06F 3/0659
See application file for complete search history.

(56) References Cited

U.S. PATENT DOCUMENTS

| | | | | |
|---|---|---|---|---|
| 6,163,856 A | * | 12/2000 | Dion | G06F 11/2064 709/213 |
| 2007/0169186 A1 | * | 7/2007 | Ueoka | G06F 3/0605 726/15 |
| 2016/0179409 A1 | * | 6/2016 | Simacek | G06F 3/0619 711/125 |
| 2018/0115594 A1 | * | 4/2018 | Uppili | H04L 65/80 |
| 2020/0036604 A1 | * | 1/2020 | Kalman | G06F 3/0653 |

OTHER PUBLICATIONS

EMC Corporation. "EMC® VMAX® eNAS CLI Reference Guide—For: VMAX3™ Family: VMAX 100K, 200K, 400K VMAX All Flash: 250F, 450F, 850F, 950F—Revision 01", [https://www.emc.com/collateral/TechnicalDocument/docu84178.pdf], Version 8.1.12. 27, May 2017, 643 pages.

* cited by examiner

Primary Examiner — Idriss N Alrobaye
Assistant Examiner — Ronald T Modo
(74) Attorney, Agent, or Firm — Amin, Turocy & Watson, LLP

(57) ABSTRACT

Described herein is a system that facilitates application control path over a remote data facility link. According to an embodiment, a system can comprise creating a first filesystem at a first control station. The system can further comprise establishing a first data communication link between the first control station and a second control station by increasing a bandwidth of a remote data facility link, wherein the remote data facility link facilitates communication between the first control station and the second control station. The system can further comprise creating a second filesystem at the second control station, wherein the first filesystem is communicatively connected to the second filesystem via the first data communication link.

20 Claims, 10 Drawing Sheets

ENABLING APPLICATION CONTROL PATH OVER A REMOTE DATA FACILITY LINK

TECHNICAL FIELD

The subject disclosure relates generally to data storage system, and more particularly, this disclosure relates to various embodiments for facilitating application control path over a remote data facility link.

BACKGROUND

The large increase in amount of data generated by digital systems has created a new set of challenges for data storage environments. Traditional storage area network (SAN) and/or network-attached storage (NAS) architectures have not been designed to support data storage and/or protection at large multi-petabyte capacity levels.

Symmetrix remote data facility (SRDF) is a data service in the enterprise data center. This tool is used to replicate critical data to geographically dispersed data centers throughout the world. SRDF offers the ability to replicate tens of thousands of volumes replicated data to different locations globally. PowerMax™, an enterprise data storage array built with multi-controller architecture that runs an enhanced version of SRDF specific for all flash use cases. This version uses multi-core, multi-threading techniques to boost performance; and powerful write folding algorithms to greatly reduce replication bandwidth requirements along with source and target array back-end writes to flash. SRDF delivers zero data loss remote mirroring between data centers separated by up to 8000 miles. SRDF can provide asynchronous remote data replication between data centers and delivers active-active high availability for non-stop data access and workload mobility within a data center, or between data centers separated by, for example 50 miles. SRDF allows for storage array clustering, enabling even more resiliency, agility, and data mobility. SRDF allows hosts or host clusters access to logical unit number (LUN) replicated between two different sites. The hosts can see both views of the replicated LUN (R1 and R2), but it appears to the host OS as if it were the same LUN. The host can then write to both the R1 and R2 devices simultaneously. This allows automated recovery and the seamless failover of applications thus avoiding recovery scenarios altogether.

The above-described background relating data storage is merely intended to provide a contextual overview of some current issues and is not intended to be exhaustive. Other contextual information may become further apparent upon review of the following detailed description.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

The following detailed description is merely illustrative and is not intended to limit embodiments and/or applications or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that one or more embodiments can be practiced without these specific details.

Each application stored on a server control station that leverages SRDF has its own stack which needs to be created on the top of the logical unit number (LUN). In order for the application to communicate to remote site for control data, it requires another connectivity that is generally physical. The additional channel can be an overhead on the infrastructure. An RDF link can create a communication between multiple sites. Adjusting bandwidth of the RDF link can reduce overhead.

Figure 1:
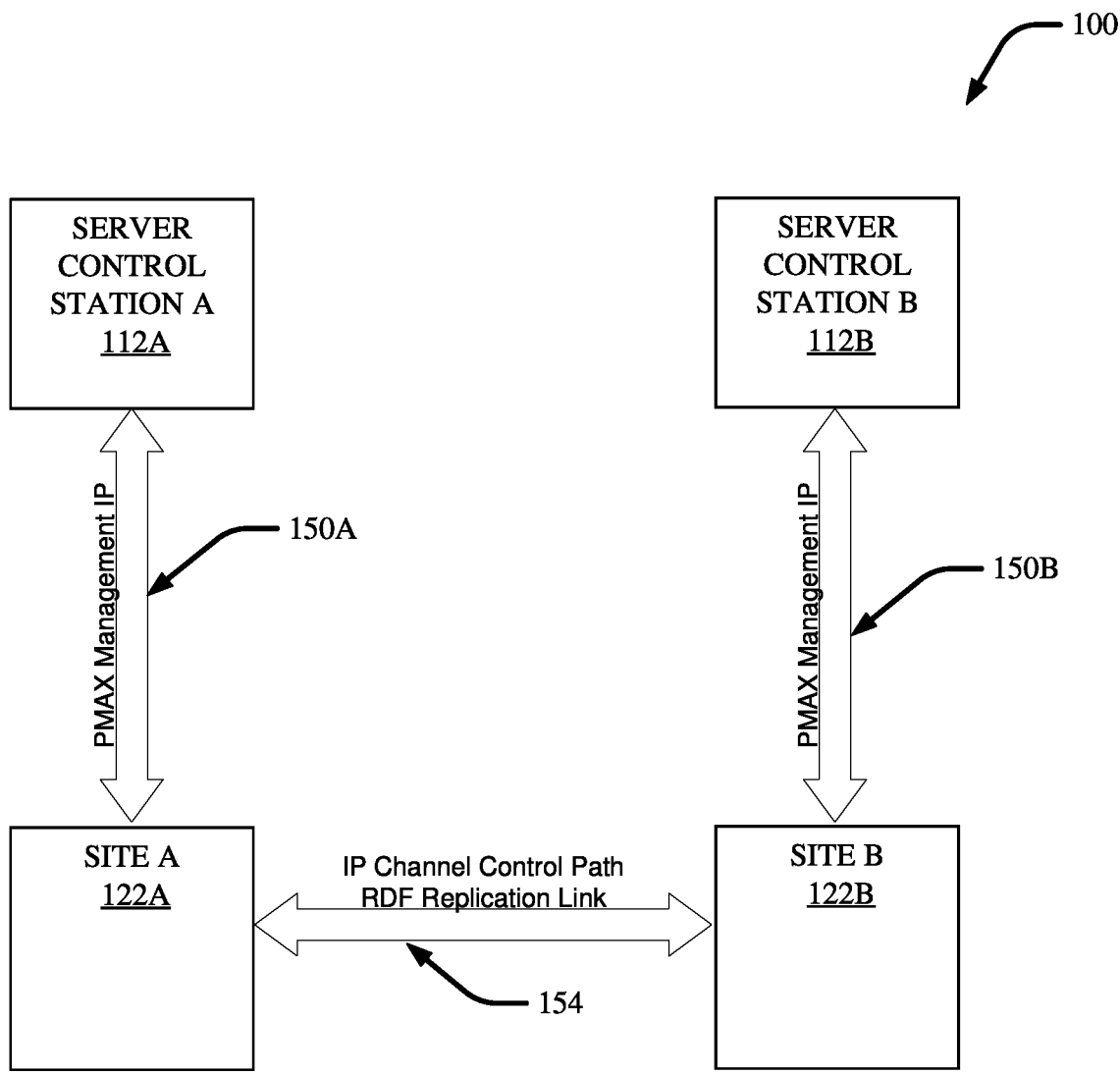
FIG. 1 illustrates an example of non-limiting data storage system employed by a data center that leverages SRDF to store and protect data in accordance with one or more embodiments described herein.

FIG. 1 illustrates an example of non-limiting data storage system 100 employed by a data center that leverages SRDF to store and protect data in accordance with one or more embodiments described herein. Repetitive description of like elements employed in respective embodiments is omitted for sake of brevity. According to some embodiments, the data storage system 100 can comprise a storage site A 122A that is communicatively connected to a control station A 112A. In some embodiments, the storage site A 122A may be arrays of servers and the control station A 112A facilitates storage of first filesystem. In some embodiments, the first filesystem comprises applications having application constructs that control the function of the application. In some embodiments, the storage site A 122A and control station A 112A are connected using a first connection 150A. In some embodiments, the first connection 150A comprises a wired (e.g., physical or land line) connection. In some embodiments, the first connection 150A is command control connection based on IP protocols. In some embodiments, the first connection 150A is PowerMax Management IP protocol connection. In some embodiments, the first connection 150A may be a wireless connection.

In some embodiments, the data storage system 100 further comprises a storage site B 122B and a control station B 112B, wherein the storage site B 122B and the control station B 112B are communicatively connected via a second connection 150B. In some embodiments, the storage site B 122B may be arrays of servers and the control station B 112B facilitates storage of second filesystem, wherein the second filesystem is a duplicate (e.g., a mirror copies, mirror image, etc.) of the first filesystem. In some embodiments, the application constructs of second filesystem can be controlled by control station A 112A using a third connection 154. In some embodiments, the storage site B 122B may be located several miles away (i.e., 1-1000 miles) from storage site A 122A. In some embodiments, the second connection 150B comprises a wired (e.g., physical or land line) connection. In some embodiments, the second connection 150B is a command control connection based on IP protocols. In some embodiments, the second connection 150B is a PowerMax Management IP protocol connection. In some embodiments, the second connection 150B may be a wireless connection.

In some embodiments, storage site A 122A is connected to storage site B 122B via the third connection 154. In some embodiments the third connection 154 comprises a remote data facility (RDF) link. In some embodiments, the third connection 154 comprises an internet protocol (IP) channel control path that facilitates transferring application control commands from storage site A 122A to storage site B 122B. In some embodiments, the bandwidth for both the RDF link and IP channel control path are adjustable. In some embodiments, the IP channel control path is used for transmitting application control commands from control station A 112A to control station B 112B. In some embodiments, the IP channel control path (also referred to as "IP channel") is generated by adjusting bandwidth of RDF link. In some embodiments, a portion of the RDF link can be wireless. In some embodiments, bandwidth for both RDF link and IP Channel can be adjusted to transmit application control commands. In some embodiments, transmit and receive resources are allocated on a temporary basis. In some embodiments, portions of the transmit and the receive resources are permanently allocated. In some embodiments, portions of the transmit and the receive resources are allocated based on time required to transmit/receive application control commands. The data (e.g., application control commands) are transmitted employing one or more data packets. In some embodiments, upon creation of the first filesystem at control station A 112A, a copy is created at control station B 112B employing the third connection 154.

Figure 2:
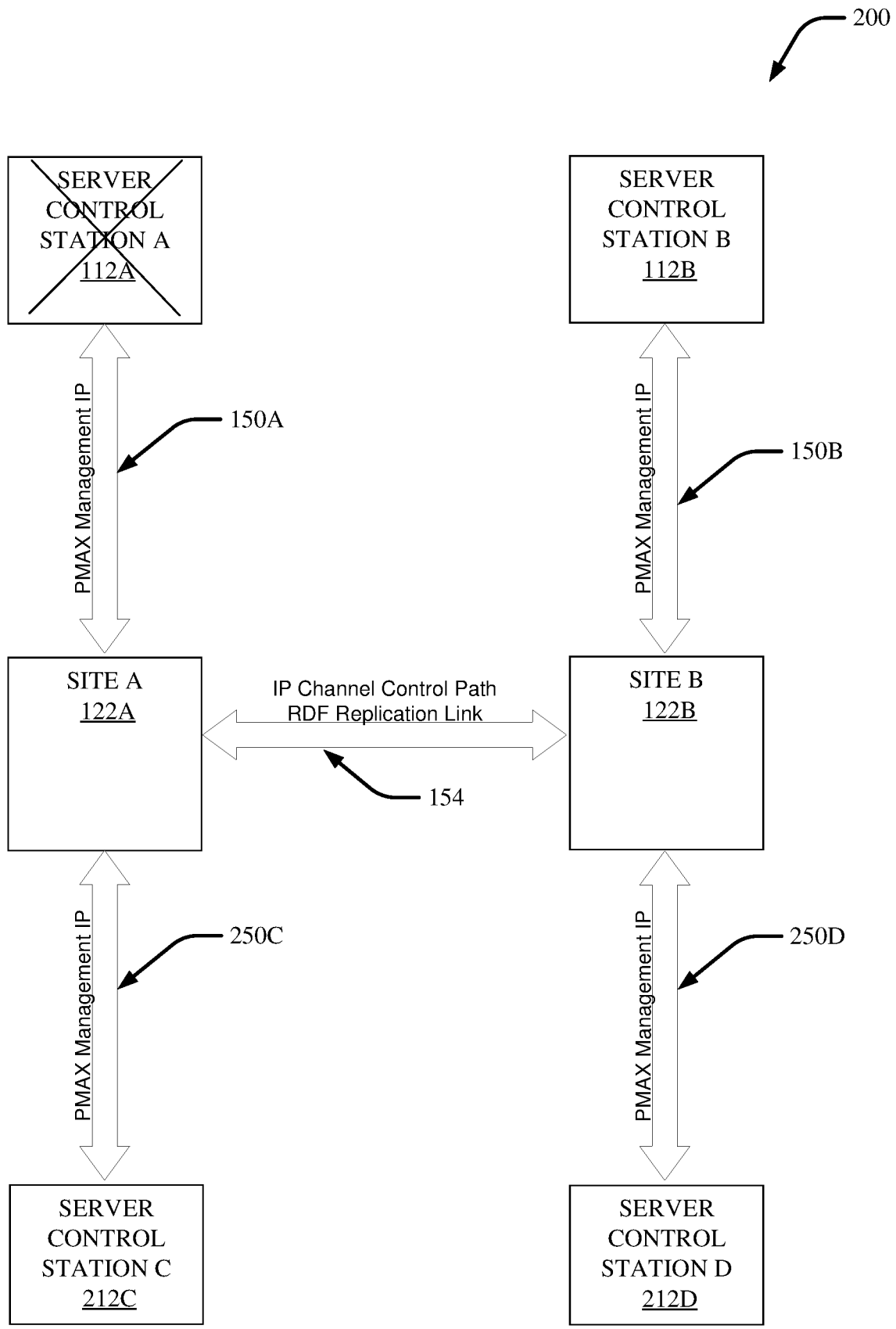
FIG. 2 illustrates an example of non-limiting data storage system employed by a data center that leverages SRDF to store and protect data in accordance with one or more embodiments described herein.

FIG. 2 illustrates an example of non-limiting data storage system 200 employed by a data center that leverages SRDF to store and protect data in accordance with one or more embodiments described herein. Repetitive description of like elements employed in respective embodiments is omitted for sake of brevity. In some embodiments, the site A 122A connects to a control station C 212C via fourth connection 250C and the site B 122B connects to a control station D 212D via fifth connection 250D. In the event of failure of control station A 112A (e.g., failure of first filesystem), a third filesystem can be created at the control station C 212C or the control station D 212D. In some embodiments, in the event of failure to access the first filesystem, the second file system is designated a primary filesystem. The third filesystem can be created at the control station C 212C or the control station D 212D, wherein the third filesystem is a copy of the second filesystem (e.g., first filesystem).

Figure 3:
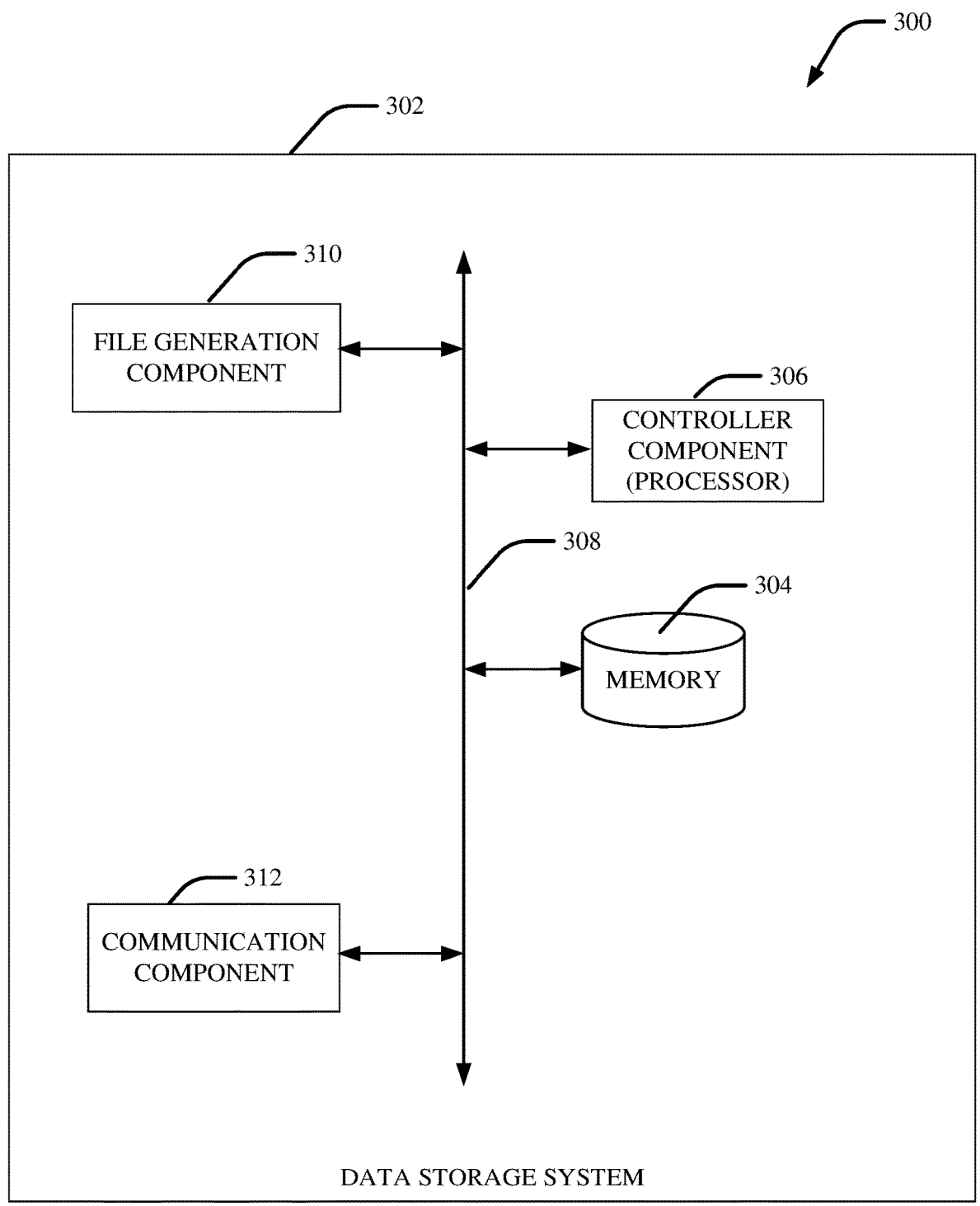
FIG. 3 illustrates a block diagram of an example, non-limiting system that facilitates operations of the data storage system components in accordance with one or more embodiments described herein.

FIG. 3 illustrates a block diagram of an example, non-limiting system 300 that facilitates application control path over remote data facility link in accordance with one or more embodiments described herein. Repetitive description of like elements employed in respective embodiments is omitted for sake of brevity. According to some embodiments, the system 300 can comprise a mobile device (not shown) and/or a fixed facility with one or more computers that can facilitate data storage system 302. In some embodiments, the data storage system 302 can include or otherwise be associated with a memory 304, a controller component 306 (also referred to as a "processor") that executes computer executable components stored in a memory 304. The data storage system 302 can further include a system bus 308 that can couple various components including, but not limited to, a file generation component 310, and a communication component 312.

Aspects of systems (e.g., the data storage system 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the data storage system 302 can comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by controller component 306, can facilitate performance of operations defined by the executable component(s) and/or instruction(s). For example, the memory 304 can store computer and/or machine readable, writable, and/or executable components and/or instructions that, when executed by the controller component 306, can facilitate execution of the various functions described herein relating to the file generation component 310, and the communication component 312.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 1016 and FIG. 10. Such examples of memory 304 can be employed to implement any embodiments of the subject disclosure.

According to some embodiments, the controller component 306 can comprise one or more types of processors and/or electronic circuitry that can implement one or more computer and/or machine readable, writable, and/or executable components and/or instructions that can be stored on the memory 304. For example, the controller component 306 can perform various operations that can be specified by such computer and/or machine readable, writable, and/or executable components and/or instructions including, but not limited to, logic, control, input/output (I/O), arithmetic, and/or the like. In some embodiments, the controller component 306 can comprise one or more central processing unit, multi-core processor, microprocessor, dual microprocessors, microcontroller, System on a Chip (SOC), array processor, vector processor, and/or another type of processor.

In some embodiments, the components of data storage system 302, for example, the controller component 306, the memory 304, the file generation component 310, and the communication component 312 can be communicatively, electrically, and/or operatively coupled to one another via the system bus 308 to perform functions of the data storage system 302, and/or any components coupled therewith. In several embodiments, the system bus 308 can comprise one or more memory bus, memory controller, peripheral bus, external bus, local bus, and/or another type of bus that can employ various bus architectures. Further examples of the system bus 308 are described below with reference to a system bus 1018 and FIG. 10. Such examples of system bus 308 can be employed to implement any embodiments of the subject disclosure.

In several embodiments, the data storage system 302 can comprise one or more computer and/or machine readable, writable, and/or executable components and/or instructions that, when executed by the controller component 306, can facilitate performance of operations defined by such component(s) and/or instruction(s). Further, in numerous embodiments, any component associated with the data storage system 302, as described herein with or without reference to the various figures of the subject disclosure, can comprise one or more computer and/or machine readable, writable, and/or executable components and/or instructions that, when executed by the controller component 306, can facilitate performance of operations defined by such component(s) and/or instruction(s). For example, the file generation component 310, and/or any other components associated with the data storage system 302 (e.g., communicatively, electronically, and/or operatively coupled with and/or employed by data storage system 302), can comprise such computer and/or machine readable, writable, and/or executable component(s) and/or instruction(s). Consequently, according to numerous embodiments, the data storage system 302 and/or any components associated therewith, can employ the controller component 306 to execute such computer and/or machine readable, writable, and/or executable component(s) and/or instruction(s) to facilitate performance of one or more operations described herein with reference to the data storage system 302 and/or any such components associated therewith.

In some embodiments, the data storage system 302 can facilitate performance of operations related to and/or executed by the components of data storage system 302, for example, the controller component 306, the memory 304, the file generation component 310, and the communication component 312. For example, as described in detail below, the data storage system 302 can facilitate: creating, by a system comprising a processor and a memory (e.g., the file generation component 310), a first filesystem at a primary control station device; facilitating, by the system (e.g., the communication component 312), establishment of a first data communication connection between the primary control station device and a secondary control station device by increasing bandwidth of a second data communication link that facilitates communication between the primary control station device and the secondary control station device; and creating, by the system (e.g., the file generation component 310), a second filesystem at the secondary control station device, wherein the first filesystem is communicatively connected to the second filesystem via the first data communication connection.

In some embodiments, the file generation component 310 can comprise, but not limited to, one or more electronic devices and processor to generate one or more metadata product. In some embodiments, the file generation component 310 periodically creates a first filesystem based on a request from a user. The filesystem may comprise one or more applications and one or more application constructs that control the functionality of the applications. In some embodiments, the file generation component 310 creates a second filesystem in response to creating a first filesystem. In some embodiments, the second filesystem can be a mirror copy that can be stored remotely at a geographical location hundreds of miles away. In some embodiments, this can be in different city, state, country or continent and can be communicatively connected to the first filesystem. In some embodiments, the connection between the first filesystem and the second filesystem is through an existing connection with adjustable bandwidth to allow for communication (e.g., transmitting commands and/or messages to of the second filesystem from the first filesystem to execute application constructs).

In some embodiments, the data storage system 302 can comprise the communication component 312 to establishing a first data communication link between the first control station and a second control station by increasing a bandwidth of a remote data facility link, wherein the remote data facility link facilitates communication between the first control station and the second control station. In some embodiments, the communication component 312 facilitates communication by determining required bandwidth to transmit control commands/messages and establishing resources to transmit control commands/messages. In some embodiments, the communication component 312 acquires resources using an existing remote data facility (RDF) link, wherein the RDF link facilitates communication between a first control station and a second control station. The RDF link may be both physical (e.g., wired or landline) or wireless link. In some embodiments, the RDF link comprise IP packet communication or communication using various wireless standards (e.g., LTE or according to various 5G standards). In some embodiment, RDF link allows for in-band communication or out-of-band communication. In some embodiments, the increasing of bandwidth comprises increasing existing resources (e.g., temporary or permanently adding a channel) or adjusting use of current resources (e.g., adjusting packet size to include control command/message data).

Figure 4:
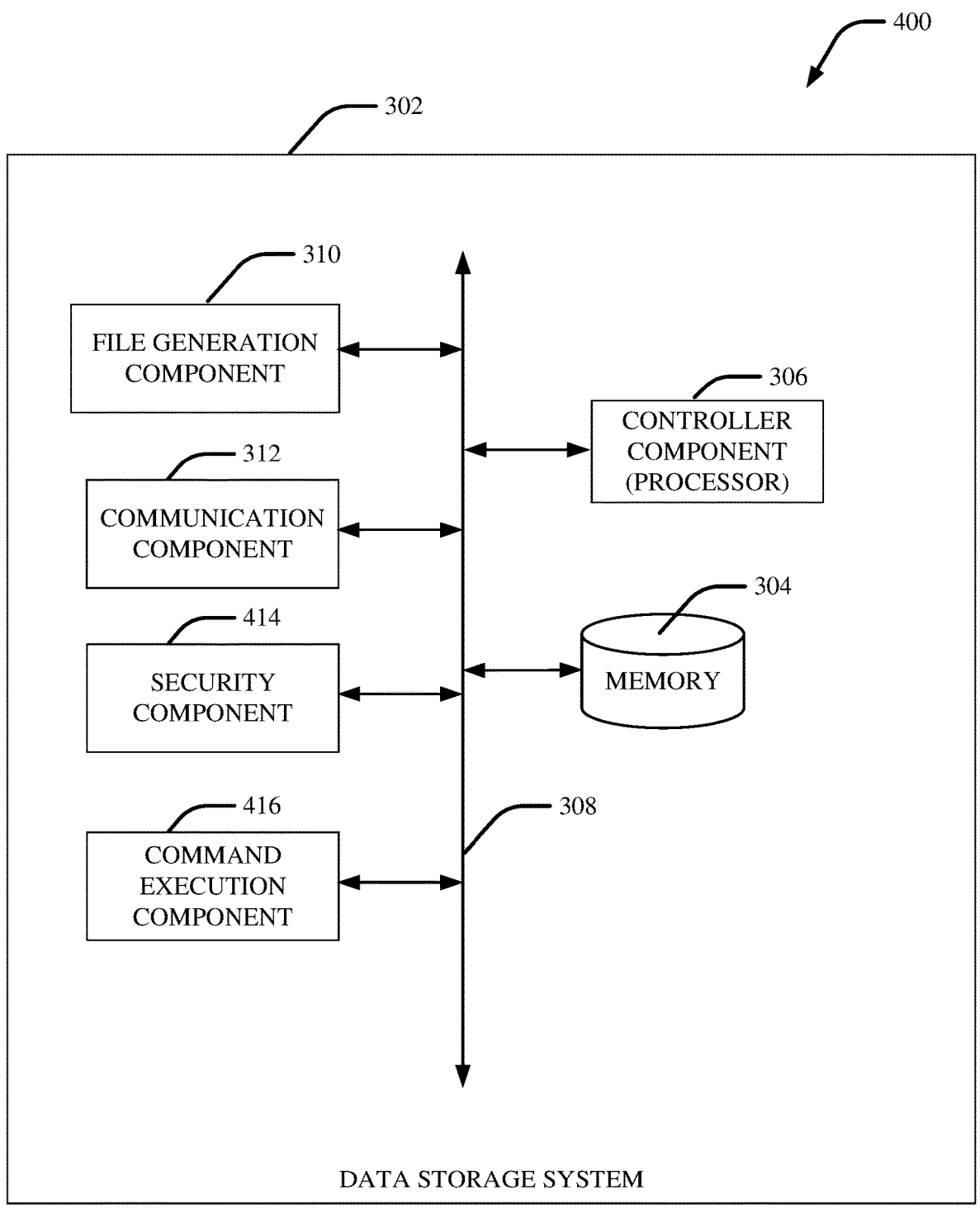
FIG. 4 illustrates a block diagram of an example, non-limiting system that facilitates operations of the data storage system components in accordance with one or more embodiments described herein.

FIG. 4 illustrates a block diagram of an example, non-limiting system 400 that facilitates operations of the data storage system 302 components in accordance with one or more embodiments described herein. Repetitive description of like elements employed in respective embodiments is omitted for sake of brevity. According to several embodiments, the system 400 can comprise data storage system 302. In some embodiments, data storage system 302 can further comprise a security component 414 and a command execution component 416.

In some embodiments, the security component 414 and the command execution component 416 can comprise one or more sensors, memory, and one or more processors to facilitate securing the communication link and generating commands/messages. In some embodiments, the security component 414 facilitates securing the first data communication link employing an internet protocol communication security model. Using various methods, to insure the commands/messages reach the second filesystem, the command/messages are encrypted prior to transmission.

In some embodiments, command execution component 416 facilitates executing remote commands from the first control station to the second control station via the first data communication link, wherein the portion of the communication link is secured by the security component 414. In some embodiments, the commands can be the same commands that control the first filesystem. Based on requirement by the user, one or more commands are generated by the command execution component 416 to control the filesystem remotely stored at the second control station using the communication link.

Figure 5:
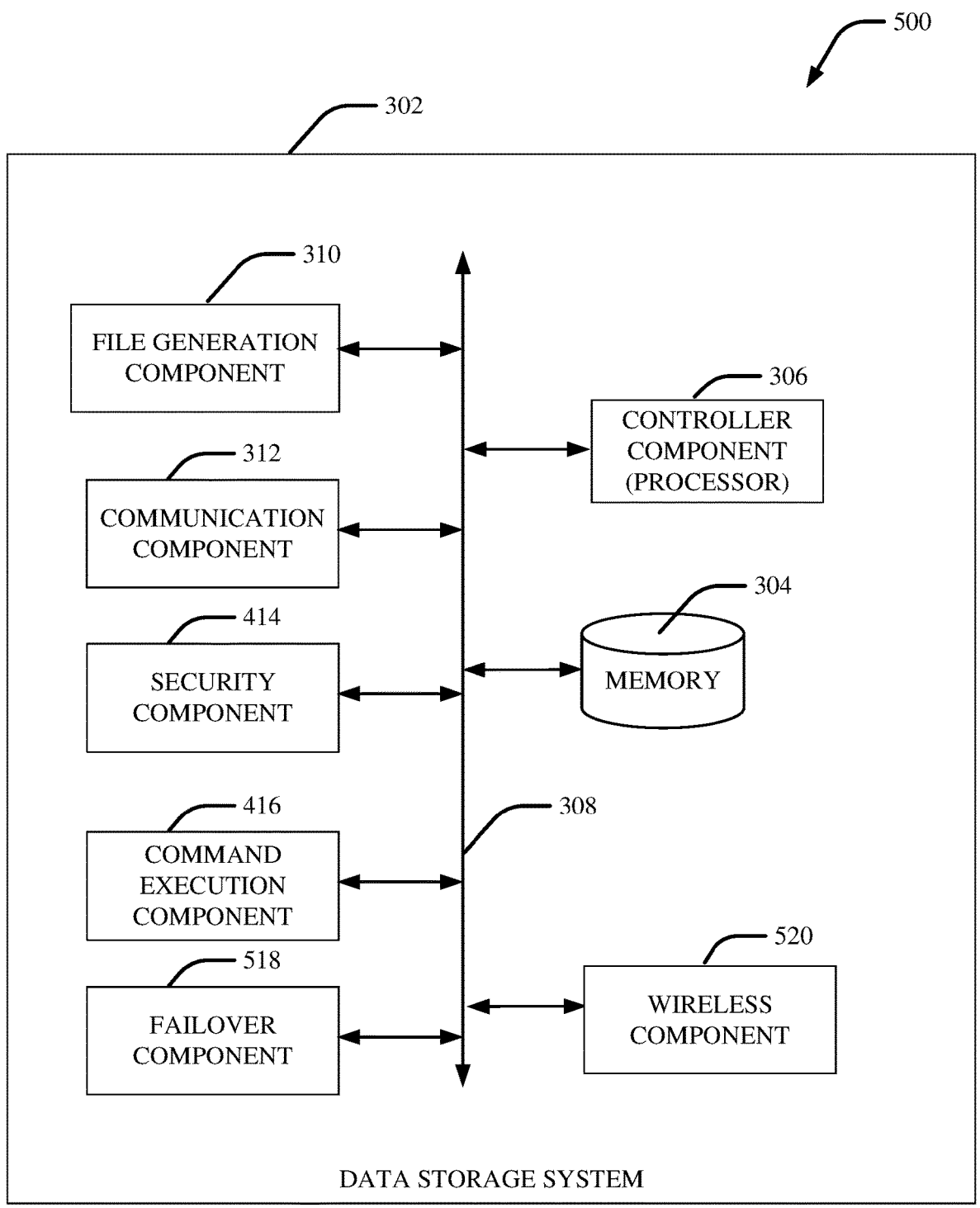
FIG. 5 illustrates a block diagram of an example, non-limiting system that facilitates operations of the data storage system components in accordance with one or more embodiments described herein.

FIG. 5 illustrates a block diagram of an example, non-limiting system 500 that facilitates operations of the data storage system 302 components in accordance with one or more embodiments described herein. Repetitive description of like elements employed in respective embodiments is omitted for sake of brevity. According to several embodiments, the system 500 can comprise data storage system 302. In some embodiments, data storage system 302 can further comprise a failover component 518 and a wireless component 520.

In several embodiments, the failover component 518 can comprise one or more sensors, memory, and one or more processors to facilitate adjusting the filesystems in the event of a failure to the first filesystem. In some embodiments, when the system detects a failure at a first filesystem, the failover component 518 initiates a failover process. The failover process comprises designating the second filesystem (e.g., accessible filesystem) as primary filesystem and creates a third filesystem as backup filesystem. Upon creating the third filesystem, the second filesystem is communicatively connected to the third filesystem. The advantage is that while the first filesystem is not accessible due to failure (e.g., the failure can be caused by failure of control station or the PMAX link failure), the mirrored filesystem (e.g., the second filesystem) is accessible. Also, utilizing the existing RDF link to establish a connection between second filesystem and third filesystem.

In some embodiments, the wireless component 520 can be a wireless processor that can interface with the controller component 306 to establish wireless communication between one or more control stations. In some embodiments, the wireless component 520 can facilitate transferring data from the second filesystem to the third filesystem. According to some embodiments, the wireless component 520 can include one or more wireless networks, including, but not limited to, a cellular network, a wide area network (WAN) (e.g., the Internet access through wireless technology) or a local area network (LAN). For example, wireless component 316 can comprise wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 3 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In some embodiments, the wireless component 520 can comprise a transmitter and a receiver for infrared, near-field communication-NFC, Bluetooth, or any suitable wireless communication protocol. In some embodiments, the connection between control stations can be wireless or partially wireless. The wireless component 520 can facilitate acquiring wireless resources. In some embodiments, portion of the RDF link comprises a wireless link.

Figure 6:
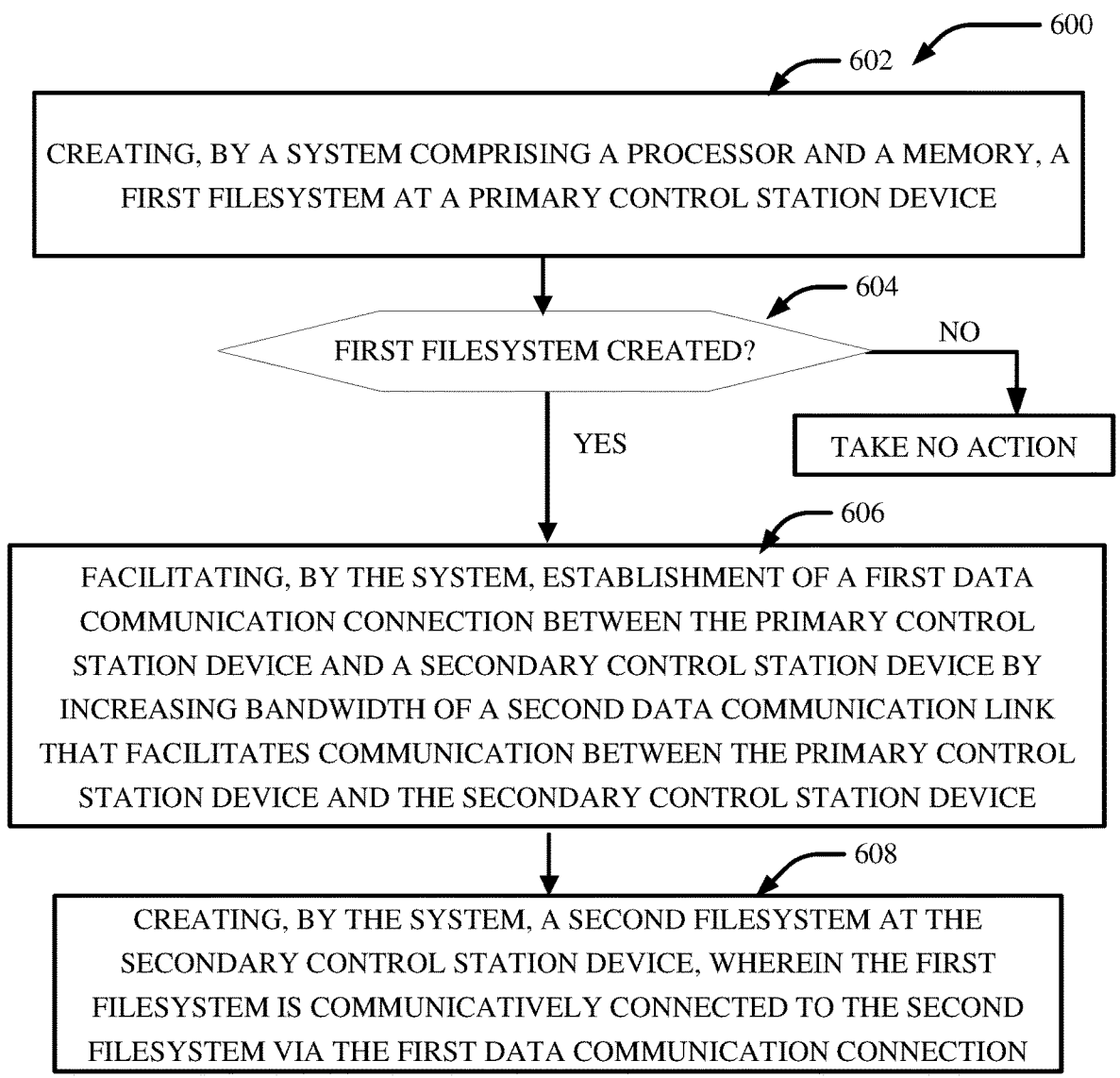
FIG. 6 depicts a diagram of an example, non-limiting computer implemented method that facilitates using the data storage system accordance with one or more embodiments describe herein.

FIG. 6 depicts a diagram of an example, non-limiting computer implemented method that facilitates using the data storage system 302 accordance with one or more embodiments describe herein. Repetitive description of like elements employed in other embodiments described herein is omitted for sake of brevity. In some examples, flow diagram 600 can be implemented by operating environment 1000 described below. It can be appreciated that the operations of flow diagram 600 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts creating, by a system comprising a processor and a memory, a first filesystem at a primary control station device. Operation 604 depicts determining if the first filesystem was created. If the first filesystem was created, then perform operation 606. Otherwise, continue monitoring. Operation 606 depicts facilitating, by the system, establishment of a first data communication connection between the primary control station device and a secondary control station device by increasing bandwidth of a second data communication link that facilitates communication between the primary control station device and the secondary control station device. Operation 608 depicts creating, by the system, a second filesystem at the secondary control station device, wherein the first filesystem is communicatively connected to the second filesystem via the first data communication connection.

Figure 7:
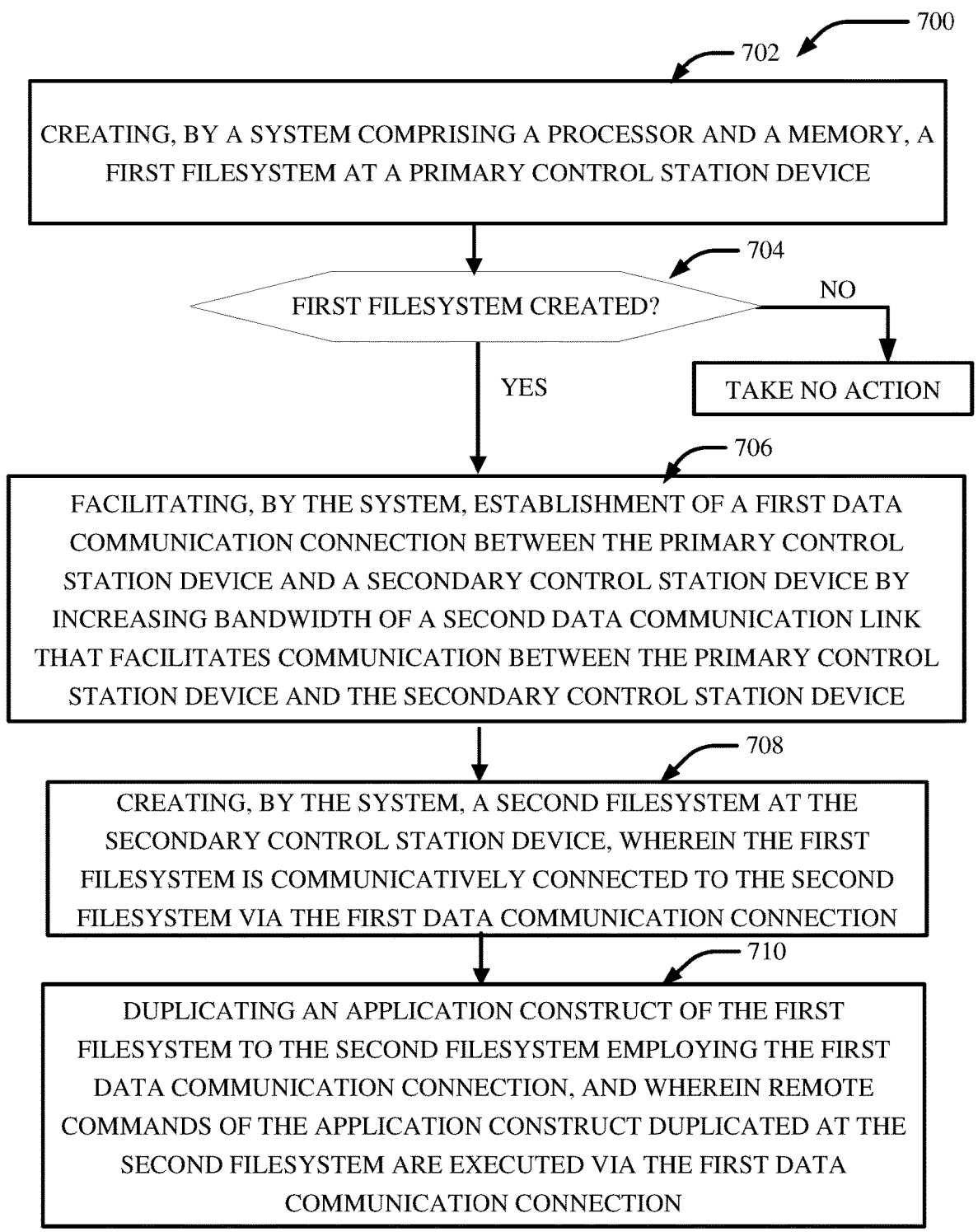
FIG. 7 depicts a diagram of an example, non-limiting computer implemented method that facilitates using the data storage system accordance with one or more embodiments describe herein.

FIG. 7 depicts a diagram of an example, non-limiting computer implemented method that facilitates using the data storage system 302 accordance with one or more embodiments describe herein. Repetitive description of like elements employed in other embodiments described herein is omitted for sake of brevity. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts creating, by a system comprising a processor and a memory, a first filesystem at a primary control station device. Operation 704 depicts determining if the first filesystem was created. If the first filesystem was created, then perform operation 706. Otherwise, continue monitoring. Operation 706 depicts facilitating, by the system, establishment of a first data communication connection between the primary control station device and a secondary control station device by increasing bandwidth of a second data communication link that facilitates communication between the primary control station device and the secondary control station device. Operation 708 depicts creating, by the system, a second filesystem at the secondary control station device, wherein the first filesystem is communicatively connected to the second filesystem via the first data communication connection. Operation 710 depicts duplicating an application construct of the first filesystem to the second filesystem employing the first data communication connection, and wherein remote commands of the application construct duplicated at the second filesystem are executed via the first data communication connection.

Figure 8:
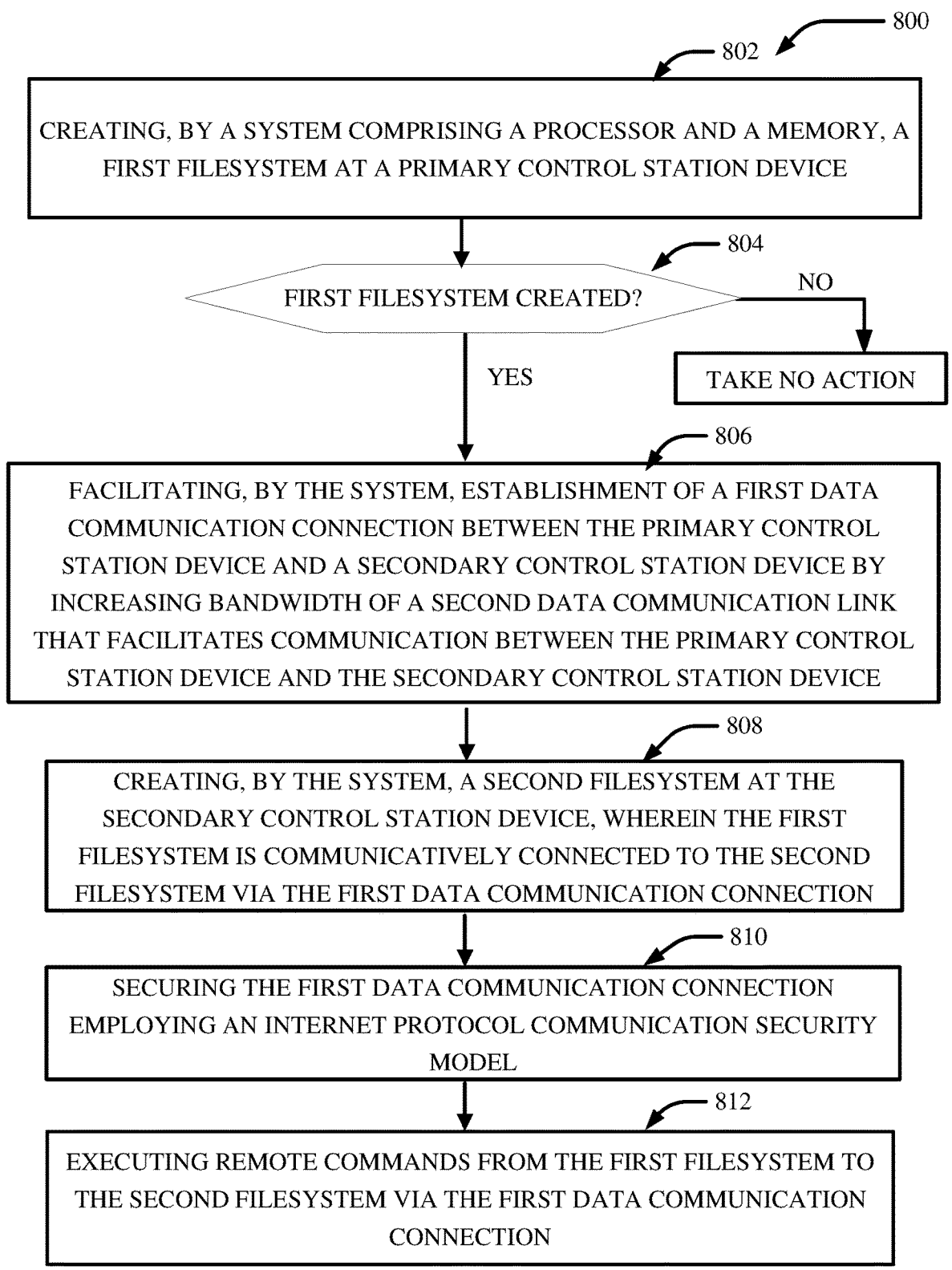
FIG. 8 depicts a diagram of an example, non-limiting computer implemented method that facilitates using the data storage system accordance with one or more embodiments describe herein.

FIG. 8 depicts a diagram of an example, non-limiting computer implemented method that facilitates using the data storage system 302 accordance with one or more embodiments describe herein. Repetitive description of like elements employed in other embodiments described herein is omitted for sake of brevity. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts creating, by a system comprising a processor and a memory, a first filesystem at a primary control station device. Operation 804 depicts determining if the first filesystem was created. If the first filesystem was created, then perform operation 806. Otherwise, continue monitoring. Operation 806 depicts facilitating, by the system, establishment of a first data communication connection between the primary control station device and a secondary control station device by increasing bandwidth of a second data communication link that facilitates communication between the primary control station device and the secondary control station device. Operation 808 depicts creating, by the system, a second filesystem at the secondary control station device, wherein the first filesystem is communicatively connected to the second filesystem via the first data communication connection. Operation 810 depicts securing the first data communication connection employing an internet protocol communication security model. Operation 812 depicts executing remote commands from the first filesystem to the second filesystem via the first data communication connection.

Figure 9:
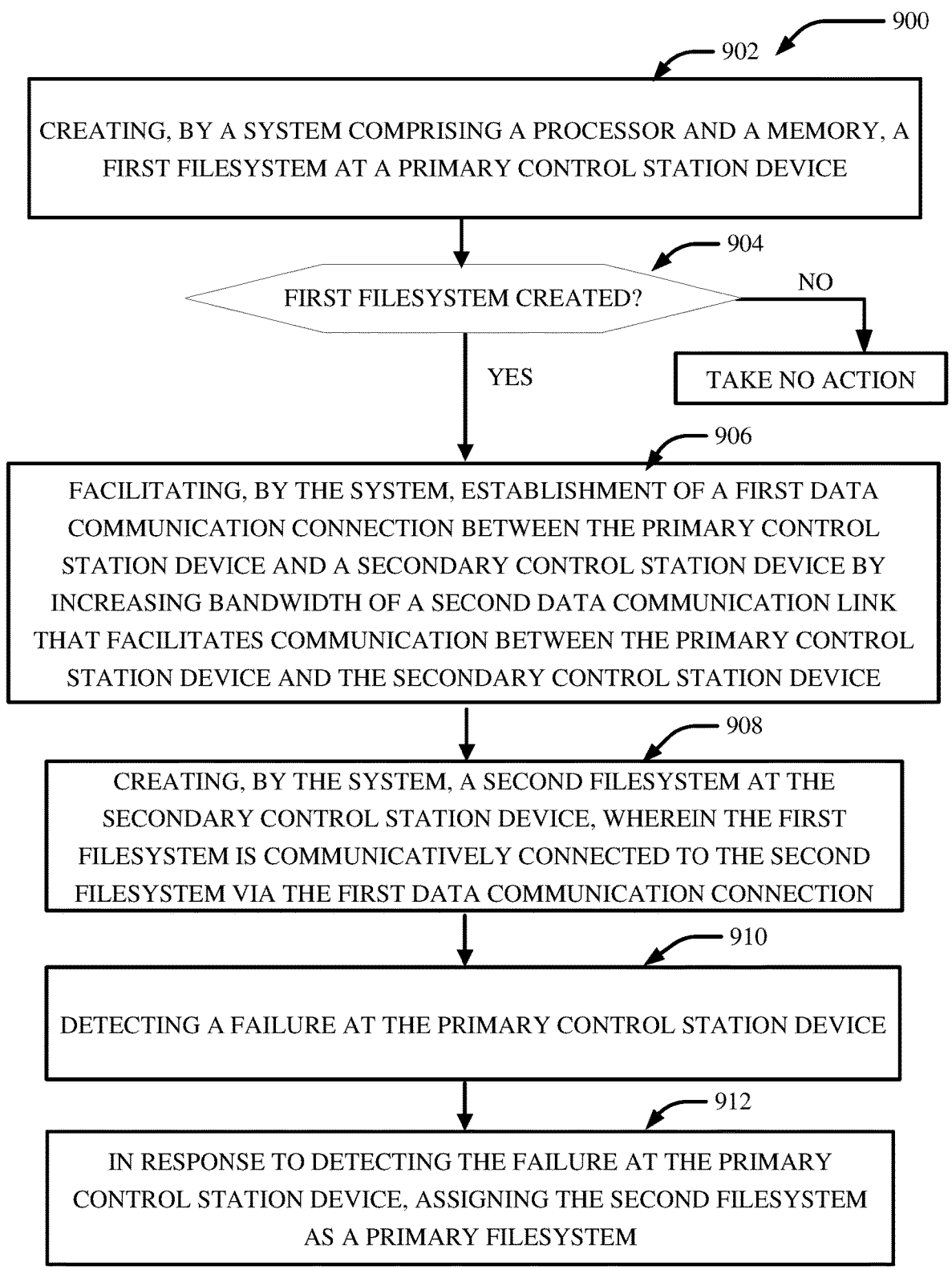
FIG. 9 depicts a diagram of an example, non-limiting computer implemented method that facilitates using the data storage system accordance with one or more embodiments describe herein.

FIG. 9 depicts a diagram of an example, non-limiting computer implemented method that facilitates using the data storage system 302 accordance with one or more embodiments describe herein. Repetitive description of like elements employed in other embodiments described herein is omitted for sake of brevity. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts creating, by a system comprising a processor and a memory, a first filesystem at a primary control station device. Operation 904 depicts determining if the first filesystem was created. If the first filesystem was created, then perform operation 906. Otherwise, continue monitoring. Operation 906 depicts facilitating, by the system, establishment of a first data communication connection between the primary control station device and a secondary control station device by increasing bandwidth of a second data communication link that facilitates communication between the primary control station device and the secondary control station device. Operation 908 depicts creating, by the system, a second filesystem at the secondary control station device, wherein the first filesystem is communicatively connected to the second filesystem via the first data communication connection. Operation 910 depicts detecting a failure at the primary control station device. Operation 912 depicts, in response to detecting the failure at the primary control station device, assigning the second filesystem as a primary filesystem.

Figure 10:
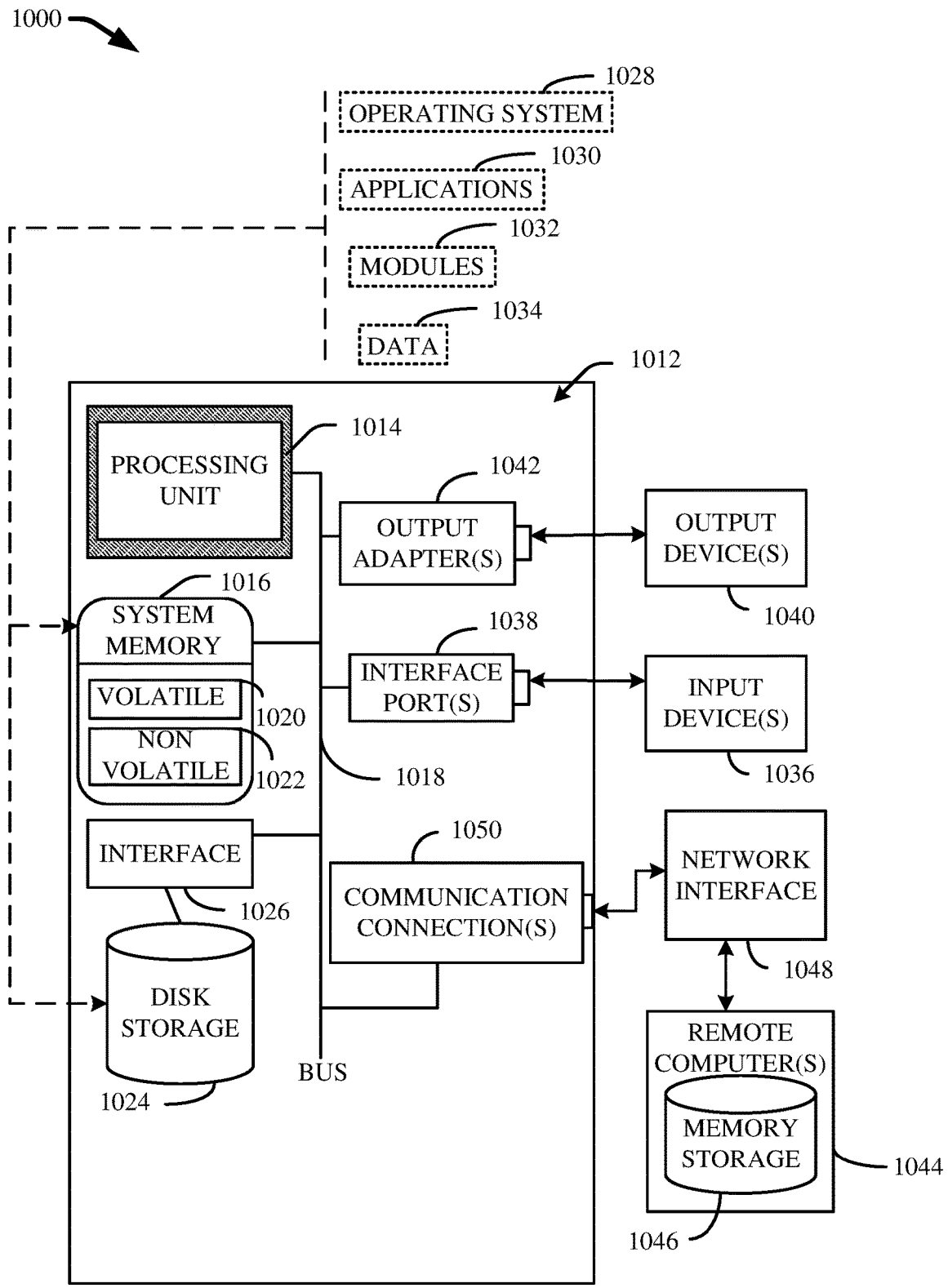
FIG. 10 illustrates a block diagram of an example, non-limiting operating environment in which one or more embodiments described herein can be facilitated.

FIG. 10 illustrates a block diagram of an example, non-limiting operating environment 1000 in which one or more embodiments described herein can be facilitated. The operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all the elements described relative to computer 1012. For purposes of brevity, only a memory storage device 1046 is illustrated with remote computer(s) 1044. Remote computer(s) 1044 is logically coupled to computer 1012 through a network interface 1048 and then physically coupled via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be coupled to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a memory that stores executable instructions that, when executed by the processor, facilitate performance of operations, comprising:
creating a first filesystem at a first control station;
establishing a first data communication link between the first control station and a second control station, the establishing comprising establishing communications for the first data communication link with a first packet size for data, determining a requested bandwidth for a remote data facility link to facilitate communication between the first control station and the second control station, and adjusting a bandwidth of the remote data facility link until the bandwidth reaches the requested bandwidth, wherein the remote data facility link facilitates the communication between the first control station and the second control station, and based on the establishing of the first data communication link, increasing packet size from the first packet size to a second packet size for data transmitted to comprise application control commands and message data;

creating a second filesystem at the second control station, wherein the first filesystem is communicatively connected to the second filesystem via the first data communication link;

securing the first data communication link employing an internet protocol communication security model, wherein the first data communication link facilitates transferring the application control commands from the first filesystem to the second filesystem;

initiating execution of a first remote command, from the first control station for the execution to be performed at the second control station, wherein the initiating the execution comprises initiating the execution via the first data communication link; and based on a user-specified requirement, generating a second remote command that controls the second filesystem, wherein the second remote command is remotely stored at the second control station, via the first data communication link.

2. The system of claim 1, wherein the second filesystem is a replication of the first filesystem, and wherein a second application construct of the second filesystem is identical to a first application construct of the first filesystem and remote commands of the second application construct are executed via the first data communication link.

3. The system of claim 1, wherein the operations further comprise:
executing remote commands from the first filesystem to the second filesystem via the first data communication link, wherein the remote commands are encrypted prior to transmission.

4. The system of claim 1, wherein the first data communication link comprises an internet protocol link that is secured using a first security model comprising a security component to facilitate securing the first data communication link.

5. The system of claim 1, wherein the operations further comprise:
maintaining a first communication link between the first filesystem and the first control station; and
maintaining a second communication link between the second filesystem and the second control station.

6. The system of claim 1, wherein the operations further comprise:
in response to detecting a failure at the first filesystem, assigning the second filesystem as a primary filesystem and creating a third filesystem; and
transferring data from the second filesystem to the third filesystem.

7. The system of claim 1, wherein the first data communication link comprises a non-volatile memory express protocol.

8. A method, comprising:
creating, by a system comprising a processor and a memory, a first filesystem at a primary control station device;
facilitating, by the system, establishment of a first data communication connection having a first packet size for data, between the primary control station device and a secondary control station device by facilitating determination of a target bandwidth for a second data communication connection to facilitate communication between the primary control station device and the secondary control station device, facilitating, by the system, adjustment of a bandwidth of the second data communication connection to reach the target bandwidth for the second data communication connection that facilitates the communication between the primary control station device and the secondary control station device, based on the establishment of the first data communication connection, increasing, by the system, packet size from the first packet size to a second packet size for data transmitted to comprise application control commands and message data;

creating, by the system, a second filesystem at the secondary control station device, wherein the first filesystem is communicatively connected to the second filesystem via the first data communication connection;

securing the first data communication connection employing an internet protocol communication security model, wherein the first data communication connection facilitates transferring the application control commands from the first filesystem to the second filesystem;

executing a first remote command, from the first control station to be executed at the second control station, via the first data communication connection; and based on a user-specified requirement, generating a second remote command to control the second filesystem, wherein the second remote command is remotely stored at the second control station, via the first data communication connection.

9. The method of claim 8, further comprising:
duplicating, by the system, an application construct of the first filesystem to the second filesystem employing the first data communication connection, and wherein remote commands of the application construct duplicated at the second filesystem are executed via the first data communication connection.

10. The method of claim 8, further comprising executing, by the system, remote commands from the first filesystem to the second filesystem via the first data communication connection, wherein the remote commands are encrypted prior to transmission.

11. The method of claim 8, further comprising:
facilitating, by the system, generating a first communication connection between the first filesystem and the primary control station device; and
facilitating, by the system, generating a second communication connection between the second filesystem and the secondary control station device.

12. The method of claim 8, further comprising:
detecting, by the system, a failure at the primary control station device; and
in response to the detecting the failure at the primary control station device, assigning, by the system, the second filesystem as a primary filesystem.

13. The method of claim 8, wherein the first data communication connection comprises a non-volatile memory express protocol.

14. A non-transitory machine-readable medium, comprising executable instructions that, when executed by a processor, facilitate performance of operations, comprising:
creating a primary filesystem at a primary control station;
establishing a first data communication connection having a first packet size for data;
increasing a bandwidth of an existing data communication connection that facilitates communication between the primary control station and a secondary control station to a specified bandwidth;
as a result of the increasing the bandwidth to the specified bandwidth, generating a first data communication connection employing a non-volatile memory express protocol to connect the primary control station and the secondary control station;

based on the establishing of the first data communication connection, increasing packet size from the first packet size to a second packet size for data transmitted to comprise application control commands and message data;

creating a secondary filesystem at the secondary control station, wherein the primary filesystem is communicatively connected to the secondary filesystem via the first data communication connection;

securing the first data communication connection employing an internet protocol communication security model, wherein the first data communication connection facilitates transferring the application control commands from the first filesystem to the second filesystem;

causing a first remote command, originating from the first control station, to be executed at the second control station via the first data communication connection; and based on a user-specified requirement, generating a second remote command usable to control the second filesystem, wherein the second remote command is remotely stored at the second control station, via the first data communication connection.

15. The non-transitory machine-readable medium of claim 14, wherein the operations further comprise:
transferring an application construct stored on the primary filesystem to the secondary filesystem employing the first data communication connection, and wherein remote commands of the application construct transferred to the secondary filesystem are executed via the first data communication connection.

16. The non-transitory machine-readable medium of claim 14, wherein the operations further comprise:
detecting a failure at the primary control station; and
in response to the detecting the failure at the primary control station, assigning the secondary filesystem as a new primary filesystem.

17. The non-transitory machine-readable medium of claim 14, wherein the operations further comprise:
based on continuous monitoring, determining the first filesystem was created.

18. The non-transitory machine-readable medium of claim 14, wherein the operations further comprise:
determining a failure at the primary control station.

19. The non-transitory machine-readable medium of claim 18, wherein the operations further comprise:
in response to determining the failure, assigning the secondary filesystem as the primary filesystem.

20. The non-transitory machine-readable medium of claim 18, wherein the operations further comprise:
in response to determining the failure, creating a third filesystem at a third control station, wherein the third filesystem is a replication of the second filesystem.

* * * * *